(12) United States Patent
Stirling

(10) Patent No.: US 6,298,492 B1
(45) Date of Patent: Oct. 9, 2001

(54) NET HEADGEAR WITH FACE STABILIZER

(76) Inventor: William H. Stirling, 1201 S. 1700 East, Fruit Heights, UT (US) 84037

( * ) Notice: Subject to any disclaimer, the term of this patent is extended or adjusted under 35 U.S.C. 154(b) by 0 days.

(21) Appl. No.: 09/656,920

(22) Filed: Sep. 7, 2000

(51) Int. Cl.⁷ ..................................................... A42B 1/18
(52) U.S. Cl. ................................................ 2/206; 2/4; 2/9
(58) Field of Search ................... 2/206, 4, 424, 2/9, 84

(56) References Cited

U.S. PATENT DOCUMENTS

| | | | |
|---|---|---|---|
| 766,426 | * | 8/1904 | Comstock . |
| 2,020,008 | * | 11/1935 | Yorgensen . |
| 2,774,970 | * | 12/1956 | Du Bois . |
| 3,823,418 | * | 7/1974 | Piper .......................................... 2/206 |
| 4,141,086 | * | 2/1979 | Jackson . |
| 4,285,068 | * | 8/1981 | Ross ..................................... 2/206 X |
| 5,091,996 | * | 3/1992 | Kirby ....................................... 2/206 |
| 5,410,763 | * | 5/1995 | Bolle . |
| 5,428,407 | * | 6/1995 | Sheffield . |

* cited by examiner

Primary Examiner—Rodney M. Lindsey
(74) Attorney, Agent, or Firm—William H. Stirling

(57) ABSTRACT

A net headgear including an eye cover frame and a net hood with eye openings therethrough to fit over the head of a user, the eye cover frame having a surrounding frame extending around lens areas through the eye cover frame and with the lens areas separated by a nose bridge and aligned with the eye openings through the hood and being open or covered with plain lenses or prescription lenses, and clip means on the surrounding frame to secure prescription glasses to the surrounding frame, with the lenses of the prescription glasses aligned with the lens areas and with removable temple pieces attached to opposite ends of the eye cover frame and temple pieces of the eyeglasses to cooperate with the nose bridge and a bridge of the eyeglasses to stabilize the net headgear on a user's head.

2 Claims, 3 Drawing Sheets

NET HEADGEAR WITH FACE STABILIZER

CROSS REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Figure 1:
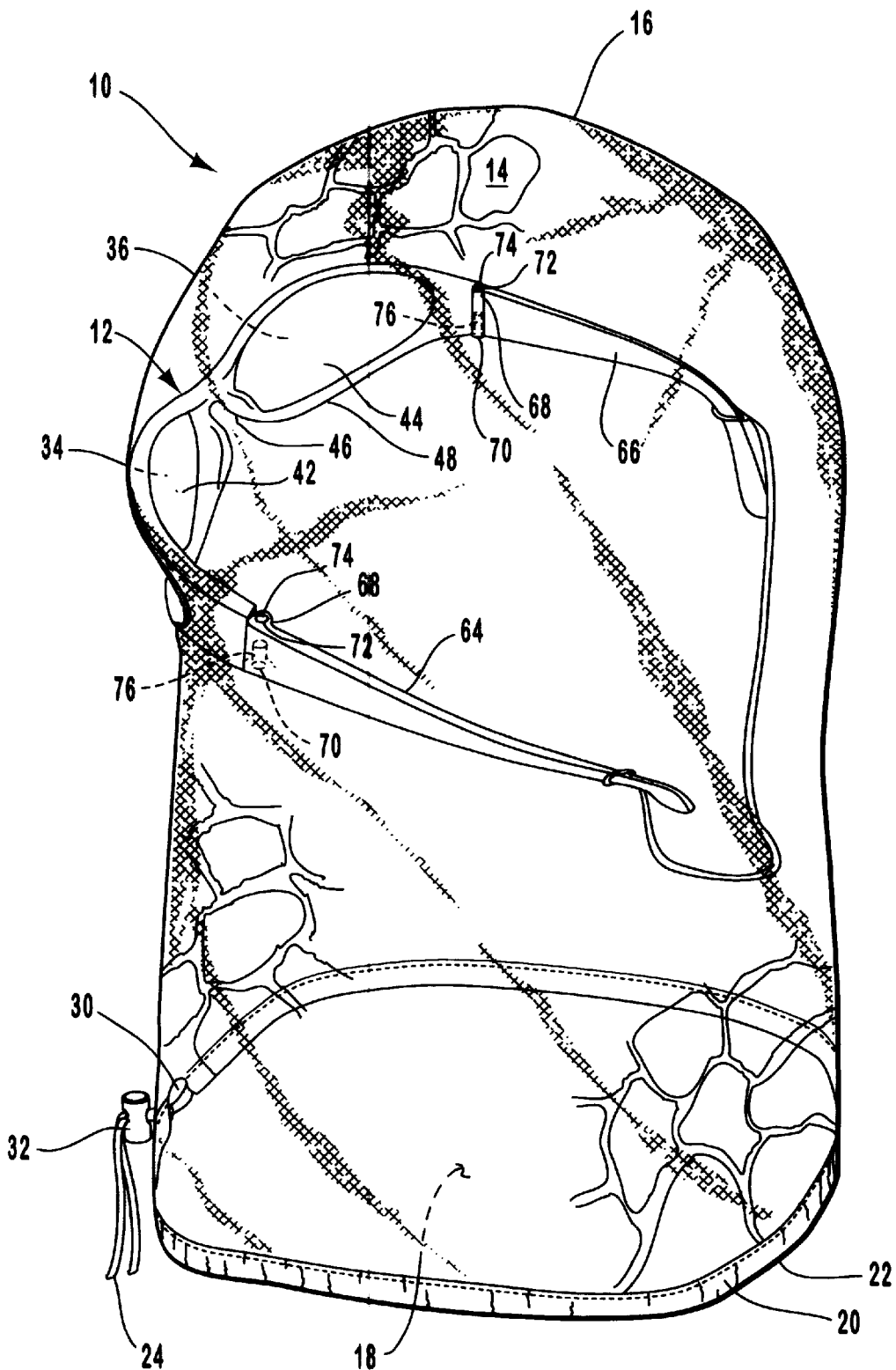

This invention relates to head covering net headgear such as is commonly used in any desired color by beekeepers and others and in camouflage colors by hunters and military personnel.

BRIEF SUMMARY OF THE INVENTION

It is well known that beekeepers and others wear net headgear that will protect them from insect stings and bites. It has also become common for hunters, military personnel, and others to use camouflaged netting having camouflage patterns in selected colors over the user's face and head so that such users will not be detected as a result of light reflections from skin and skin color being observed. Typically, the netting may have a dull green pattern or a green and brown pattern for use in grassy or wooded areas; a dull brown pattern with different shades of brown for use in drier desert areas; or a white pattern for use in snow covered areas. Other solid colors and color patterns can also be used and will normally be selected according to the terrain conditions in which the netting is to be used.

Holes are generally provided through the camouflage netting used to cover the head and face so that the user can clearly see out of the netting, without distortion of an observed site or object. It has been found, however, that often, as the user of the head and face camouflage netting attempts to view a site or object the netting on the head and face becomes twisted and the cut-out eye openings are not aligned with the eyes. This misalignment of the eye openings becomes a truly significant problem if the user is attempting to look through binauculars or to sight a bow or rifle, for example. Consequently, it is desirable that some means be provided for insuring and maintaining proper position of the eye holes, with respect to the eyes of a user.

Some net headgear, such as that used by beekeepers does not generally have eye holes, since that would allow entrance by insects. However, there is a need by such users for a headgear that will provide better vision than can be obtained by looking through net material, either with or without the use of prescription lenses.

Principal objects of the present invention are to provide a head and face covering net headgear having a stabilizer to position the eye holes of the net with respect to the eyes of a user and to effectively maintain such eyes and holes arrangement during the entire time a user is wearing the net.

Other objects are to provide a stabilized head and face covering net headgear that is adaptable to having lens covered eye openings for use by persons not needing prescription eye lenses as well as to use by persons requiring such prescription lenses for viewing.

Principal features of the invention include an eye cover frame having a centering bridge to fit on the nose of a user and lens openings that may contain lenses. The eye cover frame has removable temple pieces connected to opposite sides thereof and clips to secure the frame of prescription eyeglasses used with the frame when the temple pieces are removed from the eye cover frame. Lenses contained in the eye cover frame may be formed integrally with the frame and may be optically clear or formed to be prescription lenses. Alternatively, if a user does not require prescription lenses the lens openings may be left open in headgear not used for protection against insects. The removable temple pieces, along with the bridge stabilize the eye cover frame and the attached net on head of a user by engaging the user's nose, head and ears.

The clips on the eye cover frame are used to attach the frame and lenses of prescription glasses to the eye cover frame. Thus, with the temple pieces of the eye cover frame removed, the temple pieces of the prescription glasses, attached by clips to the eye cover frame are utilized by the user along with the bridge of the eye cover frame to stabilize the eye cover frame and attached net on the head of the user.

A strap may be attached to either the temple pieces of the eye cover frame, if used, or to the temple pieces of the prescription eyeglasses, if used.

Camouflage netting used for net headgear for hunters, military personnel and others not requiring prescription lenses or protection from insects does not require lenses in the eye openings formed in the net used. However stabilization of the headgear on the head of a user is required to insure proper alignment of the eye openings with the eyes of the user.

Additional objects and features of the invention will become apparent to those skilled in the art to which the invention pertains from the following detailed description and drawings, disclosing what is presently contemplated as being the best mode of the invention.

DRAWINGS

Figure 2:
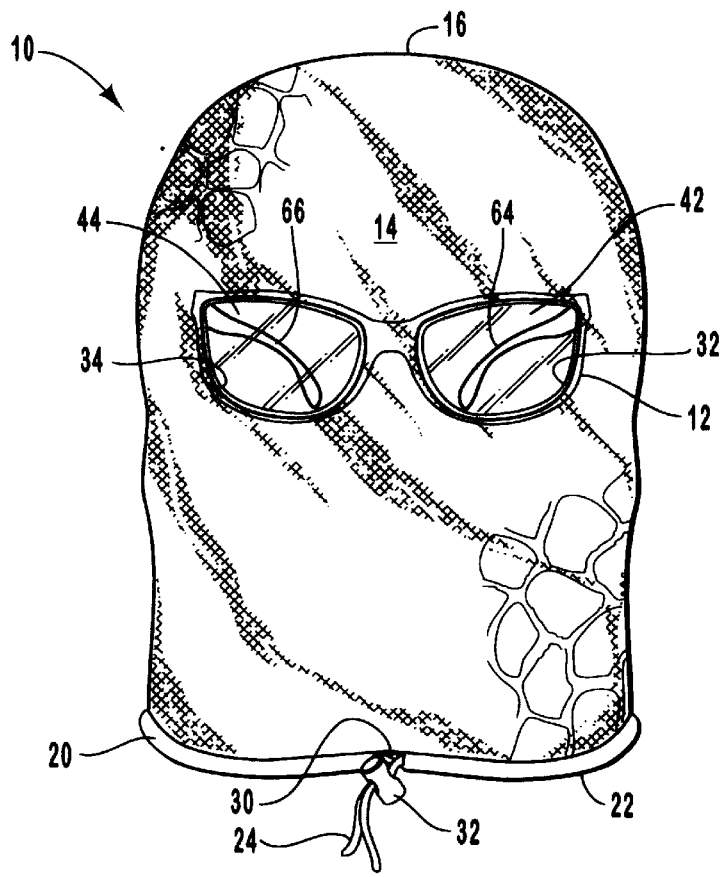
Figure 3:
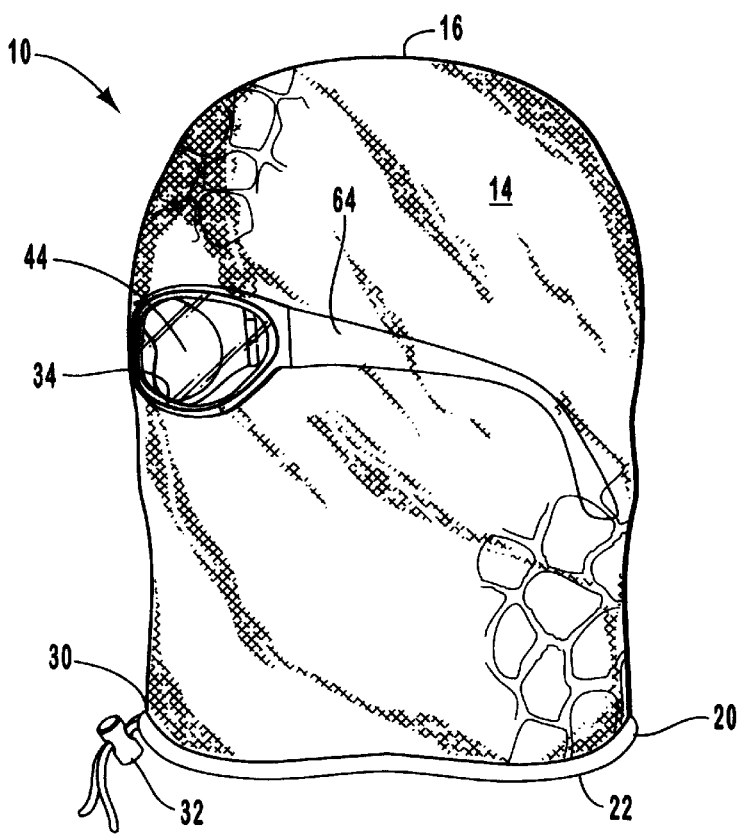
Figure 4:
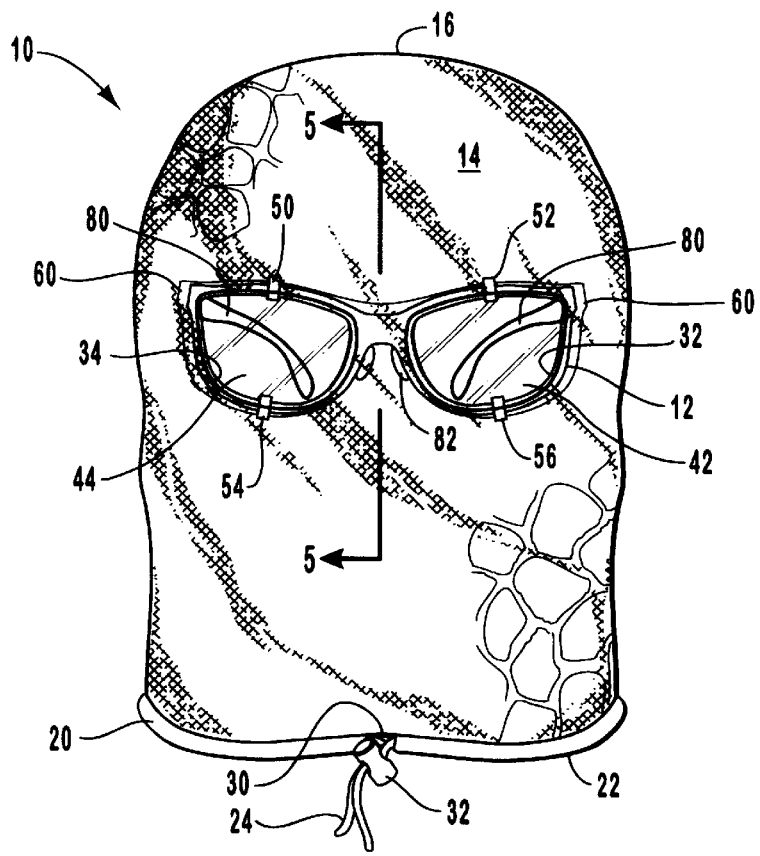
Figure 5:
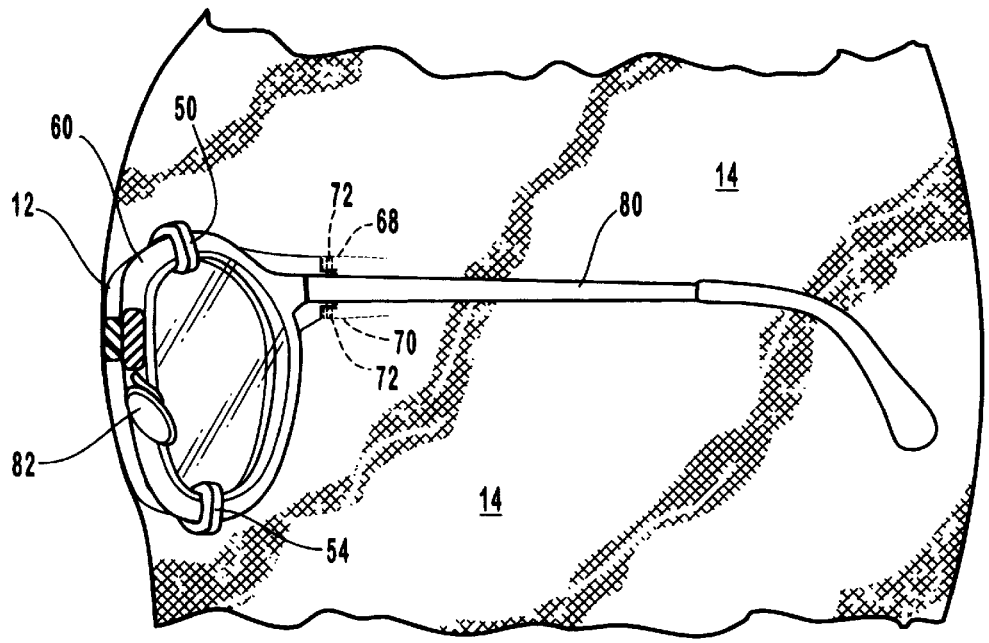

In the drawings:

FIG. 1 is a perspective view of the net headgear of the invention, including an eye cover frame and attached camouflage net the typical camouflage pattern being shown fragmentarily;

FIG. 2, a front elevation view;

FIG. 3, a side elevation view;

FIG. 4, a front elevation view, with prescription glasses positioned for use; and FIG. 5, a side elevation view of the assembly shown in FIG. 4.

DETAILED DESCRIPTION

Referring now to the drawings:

In the illustrated preferred embodiment of the invention, the net headgear, shown generally at 10 includes a rigid or semi-rigid eye cover frame 12 and an attached camouflage net hood 14.

Net hood 14 has a top end 16 and an open bottom end 18 with an enclosure 20 sewn around the bottom edge 22 thereof. A ribbon 24 passed through the enclosure 20 has ends 26 and 28 extending through an opening 30 in the enclosure and through a locking member 32, which may be of any well known construction, but that will releasably hold the opposite ends of the ribbon 24 as the open bottom of the net hood 14 is adjusted to fit the user. The net hood 14 has a pair of holes 34 and 36 set apart the distance between eyes of users. The holes 34 and 36 are large enough to accommodate different eye spacings of users.

The eye cover frame 12 has a main frame 40, to which the net hood 14 is attached. Frame 12 has a pair of lens areas 42 and 44 separated by a nose bridge 46 and a surrounding frame 48 that encloses the lens areas included and the nose bridge. The net hood 14 is attached to the eye cover frame 12, by bonding, or the like, with the material of net hood 14 surrounding the holes 34 and 36 bonded around the lens areas 42 and 44, respectively. Thus, the holes 34 and 36 respectively overlie the lens areas 42 and 44. Lens areas 42 and 44 may be filled with plain plastic transparent lenses or colored lenses and, as shown, can be made integral with the surrounding frame 48. Lenses for lens areas 42 and 44 can also be prescription ground, should that be desired.

Lens areas 42 and 44 can also be left open should a user not desire having lenses in place.

Resilient hooks 50, 52, 54 and 56 are provided on surrounding frame 48 and around the lens areas 42 and 44 to receive a frame 58 of prescription glasses 60, should a user so desire.

Eye cover frame 12 also has temple pieces 64 and 66 attached to opposite ends thereof. Top and bottom bosses 68 and 70 are formed at the opposite ends of the surrounding frame 48 and each boss has a hole 72 therethrough. Temple pieces 64 and 66 each have upwardly and downwardly projecting pins 74 and 76 extending therefrom to be respectively inserted into the holes 72 of the top and bottom bosses 68 and 70. The plastic material from which the temple pieces 64 and 66 are formed is sufficiently resilient to allow for insertion of the pins 74 and 76.

When prescription glasses 60 are secured by resilient hooks 50, 52, 54 and 56 to surrounding frame 48 the temple pieces 64 and 66 may be removed. The temple pieces 80 of the prescription glasses 60 may be used, together with the nose bridge 46 of the eye cover frame 12 and the nose bridge 82 of the prescription glasses 60 to stabilize the net hood 14 when the net hood is pulled down over the head of a user so that the user can see through the holes 34 and 36 of the net hood.

The headgear 10 is stabilized against twisting or other movement on the head of a user. Headgear 10 is suitable for use with or without prescription or plain lenses formed with or inserted into the surrounding frame 48. The headgear is usable with prescription glasses secured against the surrounding frame and is easily used, even by persons requiring camouflage netting.

Although a preferred form of my invention has been herein disclosed, it is to be understood that the present disclosure is by way of example and that variations are possible without departing from the subject matter coming within the scope of the following claims, which subject matter I regard as my invention.

What is claimed is:

1. A net headgear comprising a substantially rigid eye cover fine including a pair of eye opening areas separated by a nose bridge and a surrounding frame that encloses said eye opening areas and includes said nose bridge and a pair of temple pieces, each attached to an end of said surrounding frame; and a camouflage net hood having a pair of spaced apart eye openings therethrough, a top and an open bottom; and means securing said net hood to said eye cover frame with the eye openings of the camouflage net hood each surrounding an eye opening area of said eye cover frame.

2. A net headgear comprising a substantially rigid eye cover frame including a pair of eye opening areas separated by a nose bridge and a surrounding frame that encloses said eye opening areas and includes said nose bridge and a pair of spaced apart bosses at each end of said surrounding frame and a pair of flexible temple pieces, each removably attached to a pair of said bosses at opposite ends of said surrounding frame; a camouflage net hood secured to said eye cover frame; and clip means on said surrounding frame to grip and securely hold eye glasses with the lenses of said eye glasses against said surrounding frame, aligned with said eye opening areas, and with the temple pieces of said eye glasses replacing the temple pieces removably attached to said bosses at opposite ends of said surrounding frame.

\* \* \* \* \*